US006942477B2

United States Patent
Wood et al.

(10) Patent No.: US 6,942,477 B2
(45) Date of Patent: Sep. 13, 2005

(54) SELF-LEVELING HIGH HEAT TRANSFER MOLD

(75) Inventors: Douglas Bruce Wood, Lincoln, NE (US); Michael John William Gregg, Lincoln, NE (US)

(73) Assignee: The Goodyear Tire & Rubber Company, Akron, OH (US)

( * ) Notice: Subject to any disclaimer, the term of this patent is extended or adjusted under 35 U.S.C. 154(b) by 208 days.

(21) Appl. No.: 10/334,603

(22) Filed: Dec. 31, 2002

(65) Prior Publication Data

US 2004/0126451 A1 Jul. 1, 2004

(51) Int. Cl.⁷ .............................................. B29C 33/04
(52) U.S. Cl. ...................................... 425/28.1; 249/79
(58) Field of Search .......................... 425/28.1; 249/79, 249/80, 81

(56) References Cited

U.S. PATENT DOCUMENTS

| | | | | | |
|---|---|---|---|---|---|
| RE15,608 E | * | 5/1923 | Burroughs | ................... | 425/398 |
| 4,003,687 A | * | 1/1977 | Hedin | .......................... | 249/79 |
| 4,063,705 A | * | 12/1977 | Vodra | ........................... | 249/80 |
| 4,129,172 A | * | 12/1978 | Snee, Jr. | ....................... | 249/79 |
| 4,269,586 A | * | 5/1981 | Ronayne | ....................... | 249/79 |
| 4,437,641 A | * | 3/1984 | Stavitsky et al. | ............. | 249/79 |
| 4,964,943 A | * | 10/1990 | Kruger et al. | ................ | 249/79 |
| 5,169,549 A | * | 12/1992 | Weber | .......................... | 249/80 |

FOREIGN PATENT DOCUMENTS

| | | | |
|---|---|---|---|
| JP | 58-183211 | * | 10/1983 |
| JP | 58-183212 | * | 10/1983 |

* cited by examiner

*Primary Examiner*—James P. Mackey
(74) *Attorney, Agent, or Firm*—Brouse McDowell; Roger D. Emerson; Heather M. Barnes

(57) ABSTRACT

A mold for sequentially curing sections of a belt includes two end zones, a center zone, and transition zones between each end zone and the center zone. The mold is heated and/or cooled by heat transfer fluid flowing from intake manifolds through heat transfer cavities. The intake manifolds are preferably arranged perpendicular to the mold length. In the end zones and in the center zone, the heat transfer cavities are arranged substantially parallel to the length of the mold. The arrangement of the heat transfer cavities provides for a more controlled cure of the belt by allowing the center zone to maintain a consistent temperature throughout the center zone while allowing a cooler consistent temperature to be maintained in the end zones. The transition zones allow a steep temperature gradient from the cooler end zones to the hotter center zone. Heat transfer rates are adjustable without modification to the body of the mold.

5 Claims, 4 Drawing Sheets

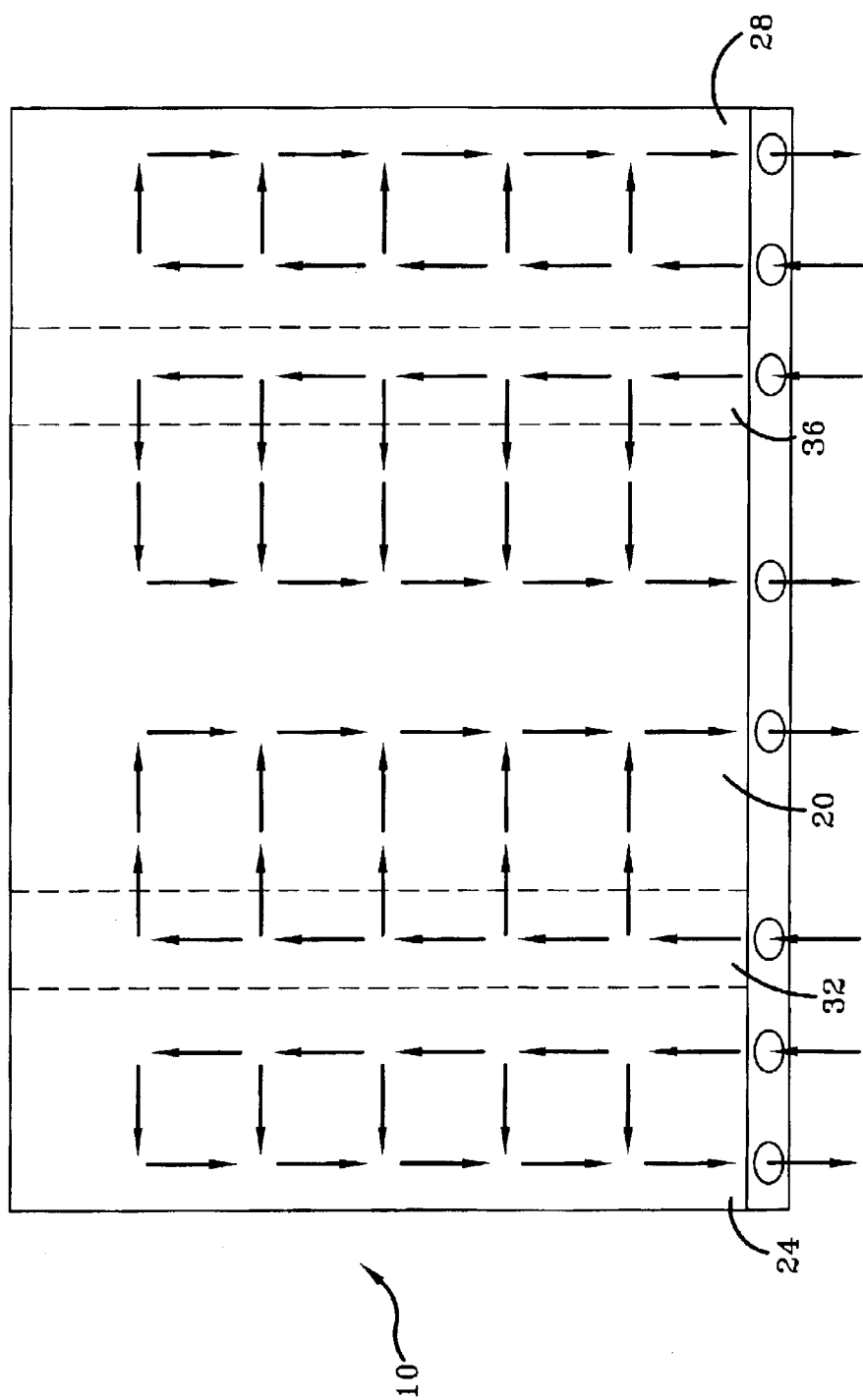

SELF-LEVELING HIGH HEAT TRANSFER MOLD

I. BACKGROUND OF THE INVENTION

A. Field of Invention

The invention is directed to the art of planar mold designs for curing long power transmission belts and the like. More particularly, the invention is directed to a mold design incorporating colder and hotter zones separated by transitional zones. The path of heat transfer fluid flow in each zone maximizes desirable heating/cooling effects.

B. Description of the Related Art

Long power transmission belts are often molded and vulcanized in sections using planar molds. The process of molding and vulcanizing is also called curing the belt. The mold surface contains cavities having the desired profile of the belt. In synchronous power transmission belts the mold includes accurately machined cavities for forming the belt teeth. The mold is applied to overlapping or abutting sections of the belt to form the required number of teeth.

In one method for forming the belts, the teeth are formed during curing, by a process called "transfer molding." During cure, the tooth material is transferred by flowing from the side of the tensile cord opposite the mold cavities to the other side. This transfer fills the cavities of the mold with fabric and elastomer prior to any significant cross-linking in the elastomer, which would prevent further movement or flow. Sections of the belt that have not been molded to the proper shape should be prevented from getting hot enough to vulcanize. When at least some of the belt materials are thermoplastic at the cure temperature, the belt should be cooled before it is removed from the mold. It is economically desirable to fully vulcanize as much of the belt as possible during each mold cycle and to make each cycle time as short as possible.

Temperature variations in the mold can require longer curing cycle times so that the coldest portion is fully cured, but longer curing cycle times can result in unacceptable over-cure in the hotter areas.

Temperature variation also causes variable thermal expansion of the mold and belt materials, which can cause variable tooth pitch within one molded section of the belt.

Molds heated by platens can have areas of poor heat conduction due to gaps and contact resistance resulting in hot or cold spots during rapid heating and cooling. Also, molds with cross-drilled fluid passages tend to be hotter at the edge where the fluid enters, especially during transient operation. A mold with cool ends and a hot center is desirable, but the transition between the ends and the center must be able to provide a steep temperature gradient.

Generally, a transient heating process is usually assumed to begin at ambient temperature. When an initial condition is required that is not considered part of a particular heating/cooling cycle, the process of bringing the mold to initial temperature is called pre-heating or pre-cooling.

For molds used at a constant temperature, the temperature of the heating fluid is often controlled to the temperature desired for the mold. If heat loss from the mold can be eliminated, the mold, starting at ambient temperature, will approach the temperature of the fluid, the difference in temperature between the mold and fluid decreasing in time depending on the thermal properties of the system. These include the geometry, mass, Cp (specific heat), and thermal conductivity of the mold, as well as the Cp, viscosity and flow rate of the fluid. Given a long enough preheat time, the mold will be very close to the fluid temperature and the temperature will be even throughout the mold. Since the heat transfer properties vary throughout the mold, some areas will be hotter than others for times less than the preheat time. More often, there are areas of the mold, like the transition area, where heat loss cannot be eliminated and those areas of the mold approach a steady state temperature that is lower than the heating fluid temperature.

For molds used in a heat/cool cycle, it is required that at least one zone of the mold changes from one temperature to at least one other temperature during the cycle. The heat/cool cycle time may be less than the preheat time needed to achieve uniform mold temperature near the fluid temperature throughout the zone. Curing is a non-linear function of the temperature, so those areas of the mold which increase in temperature slower than others can take longer to reach the desired state of cure. This means that maintaining uniform temperature during transition from one temperature to another is important for uniform cure.

The inventive mold design addresses both the problem of longer than desirable cure times and the problem of inconsistent temperature in the mold. The present invention allows shorter cure cycle times and permit higher cure temperature while minimizing the risk of over-cure.

II. SUMMARY OF THE INVENTION

According to one aspect of the present invention, there is provided a new and improved mold for curing a belt. The mold having a length along the circumference of the belt and comprising:

a) a center zone, a first end zone, a second end zone, and a first transition zone defined within a portion of the first end zone and the center zone, and a second transition zone between the second end zone and the center zone;

b) a plurality of manifolds having heat transfer cavities located in the zones of the mold wherein the heat transfer cavities in the first and second end zones are disposed substantially parallel to the length of the mold.

According to another aspect of the invention, the manifolds are arranged perpendicular to the length of the mold.

According to another aspect of the invention, the heat transfer cavities in the center zone are disposed substantially parallel to the length of the mold.

According to another aspect of the invention, the fluid inlet manifolds are located near the area of highest temperature gradient and the outlet manifolds are located near the area of lowest temperature gradient, so that fluid in the heat transfer cavities flows from high temperature gradient areas to low temperature gradient areas.

According to another aspect of the invention, the mold further comprises a first pin adapted for selective insertion in one or more of the heat transfer cavities. The pin has a diameter and profile which contributes to the pressure drop, flow rate, and film coefficients of the cavity. The pin in each cavity may be of a unique and different design according to the desired heat transfer properties of that cavity. The pin may be supported from its ends so that it does not contact the prime heat transfer surfaces of the cavity.

According to another aspect of the invention, there is provided a mold for curing a belt. The mold having a length and comprising:

a) a center zone, a first end zone, a second end zone, and a first transition zone between the first end zone and the center zone, and a second transition zone between the second end zone and the center zone;

b) means for regulating the temperature of the mold in each of the zones wherein the temperature gradient along the circumference of the belt in the center zone is minimized throughout the center zone during steady state operation to a specified temperature, and during transient operation from one specified temperature to another specified temperature; the temperature gradient in the first and second end zones remains substantially consistent throughout the first and second end zones during the cure cycle, wherein the temperature in the center zone may be greater than the temperature in the first and second end zones, and the temperature gradient along the circumference of the belt in the transition zones is maximized to make the transition zone narrow along the length of the belt.

According to another aspect of the present invention, the means for regulating the temperature of the mold in each of the zones is provided wherein the temperature in the center zone remains substantially consistent throughout the length of the center zone during the cure cycle as the temperature changes in time.

According to another aspect of the present invention, the means for regulating the temperature of the mold in each of the zones wherein the temperature in the end zones remains substantially consistent throughout the length of the ends zones during the cure cycle as the temperature changes in time.

According to another aspect of the present invention, the required cure time is reduced without reducing the effective width of the center zone.

According to another aspect of the present invention, the temperature in the center zone remains substantially consistent throughout the center zone during a cure cycle.

According to another aspect of the present invention, the resulting thermal expansion of the mold remains substantially consistent throughout the center zone during a cure cycle.

According to another aspect of the present invention, the temperature gradient is disposed over a length L2 of the mold, wherein L2 is less than L1.

According to yet another aspect of the invention, there is provided a system for curing a belt. The system comprises:
  a mold having
  a) a center zone, a first end zone, a second end zone, and a first transition zone between the first end zone and the center zone, and a second transition zone between the second end zone and the center zone;
  b) a plurality of intake manifolds disposed substantially perpendicular to the mold length and placed near the area of high temperature gradient and heat flux in the transition zone;
  c) a plurality of return manifolds disposed substantially perpendicular to the mold length; and placed near the areas of low temperature gradient and heat flux and,
  d) a plurality of heat transfer cavities, each of the heat transfer cavities being in flow communication with at least one intake manifold wherein the heat transfer cavities in the first and second end zone are disposed substantially parallel to the mold length;
  e) a pin in one or more of the heat transfer cavities of the center or end zones, said pin having a profile and size selected to change the film coefficients at any particular point along the extent of the cavity without modification to the cavity surfaces, said pin in contact or not in contact with the prime heat transfer surfaces of the cavity, depending on the desired effect of the pin on the fluid flow and convective heat transfer properties of the cavity, said pin mounted at its end or ends when not in contact with the prime heat transfer surfaces of the cavity, said pin allowing the mold to be designed with simple and economical heat transfer cavity shapes, and allowing tuning of the thermal response of the mold without modification of the heat transfer cavity.

One advantage of this invention is that sections of a belt can be sequentially cured in a substantially planar mold under highly controlled conditions. The present invention minimizes the risk of over cure even on those belt portions that are subjected to more than one cure cycle in the mold. The ends of the mold are maintained at a cooler curing temperature than the center of the mold, but the transition zones provide a steep temperature gradient.

Another advantage is that the steady state or transient heat transfer rates in various areas of the mold can be quickly and easily adjusted without modification to the relatively expensive and complex main body of the mold.

Another advantage is that the uniform temperature in the center zone at steady state or transient heat transfer rates causes uniform thermal expansion of the mold in the center zone, so that the teeth molded in the belt have uniform spacing.

Still other benefits and advantages of the invention will become apparent to those skilled in the art to which it pertains upon a reading and understanding of the following detailed specification.

III. BRIEF DESCRIPTION OF THE DRAWINGS

The invention may take physical form in certain parts and arrangement of parts, a preferred embodiment of which will be described in detail in this specification and illustrated in the accompanying drawings which form a part hereof and wherein.

IV. DETAILED DESCRIPTION OF THE PREFERRED EMBODIMENT

Figure 1:
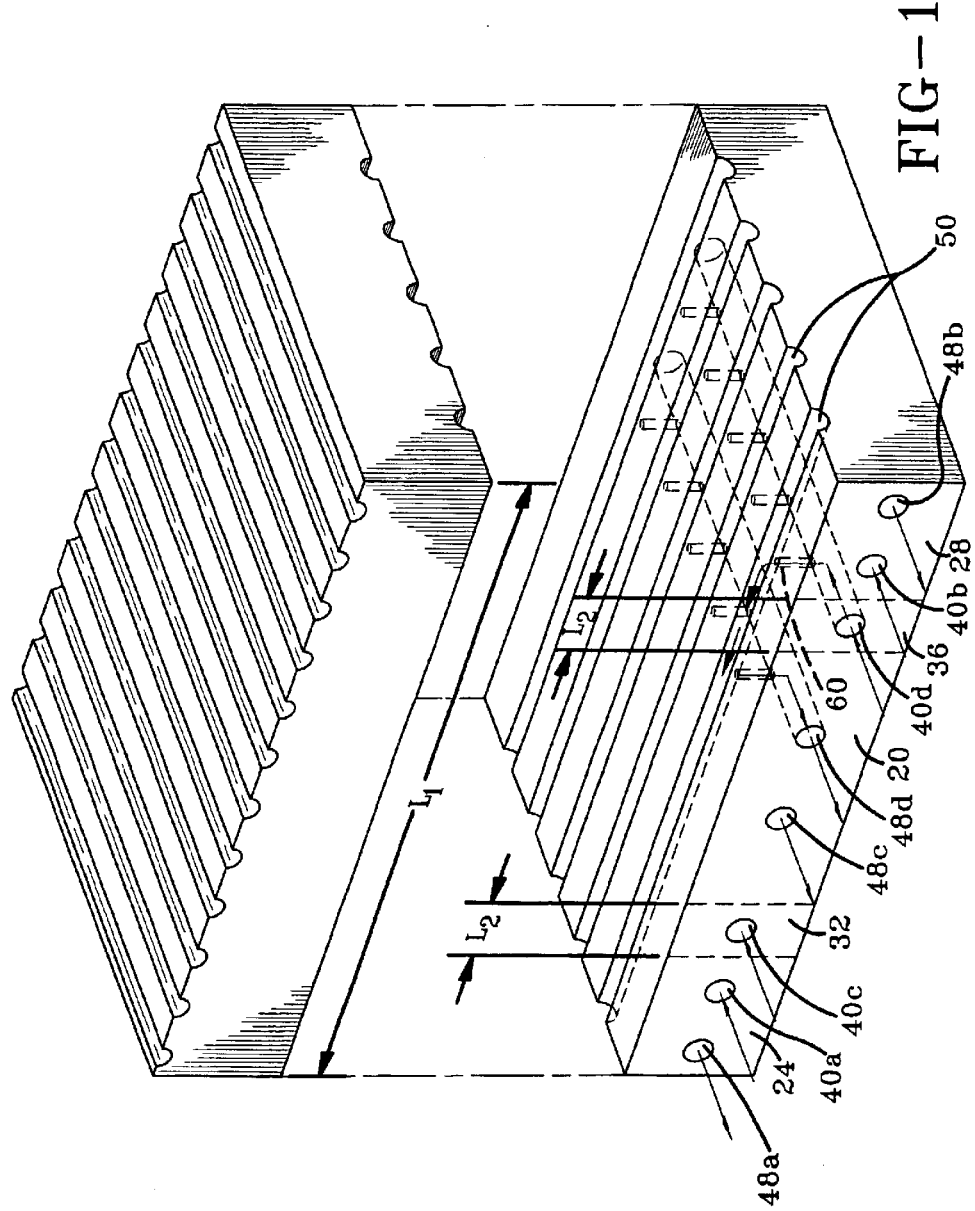
FIG. 1 is an exploded perspective view of a first mold half showing the inventive arrangement of intake and return manifolds and heat transfer cavities of the present invention.

Referring now to the drawings wherein the showings are for purposes of illustrating a preferred embodiment of the invention only and not for purposes of limiting the same, FIG. 1 shows a mold half 10A. The principles governing the heating of a mold will be explained with reference to mold half 10A for the sake of simplicity. A mating mold half (not shown in this view) utilizes similar principles. A mold for curing a belt slab includes a length, L1, which in use is disposed along the circumference of the belt. The mold is characterized by a center zone 20, a first end zone 24, a second end zone 28, a first transition zone 32 disposed generally between the first end zone 24 and the center zone 20, and a second transition zone 36 disposed generally between the second end zone 28 and the center zone 20. Each of the transition zones 32, 36 has a mold length L2, which is less than L1. Transition zone length L2 is also less than the length of the center zone 20. As shown in FIG. 1, the mold may have cavities to form straight teeth on the belt. Alternatively, the belt teeth may be helical or any other geometry chosen in accordance with sound engineering judgment.

The mold of the invention is heated and cooled by re-circulating heat transfer fluid. The mold is used in sequential heating/cooling cycles to form and cure overlapping or abutting belt sections. Although a certain length of the belt contacts the mold with each cure cycle, it is desirable that only a portion of that length be totally cured. The uncured and partially molded portion of the belt, which is in contact with the mold, will contact the mold and become fully molded and cured in a subsequent cure cycle. After cure and, if necessary, cool down, the belt is repositioned and subjected to another cure cycle. The process continues until the desired belt length is cured. For a cylindrical belt, the process continues until the initial leading portion returns to the mold and all belt teeth are cured.

The heat transfer fluid is introduced into the mold half 10A through a plurality of intake manifolds 40A, 40B, 40C, 40D. The heat transfer fluid exits through return manifolds 48A, 48B, 48C, 48D. The inventive mold half 10A includes a plurality of heat transfer cavities 50, the extent of each cavity being within the first end zone, the center zone, or the second end zone and into the adjacent transition zone. Each heat transfer cavity 50 is in flow communication with at least one intake manifold 40A–40D and at least one return manifold 48A–48D through connecting openings 60. Coaxial cavities in the center zone and end zones should not be connected to each other. In the preferred embodiment, the intake and return manifolds 40A–40D, 48A–48D are disposed substantially perpendicular to the length of the mold. This arrangement of manifolds allows rapid temperature change in the first and second transition zones 32, 36, the first and second end zones, or the center zone 20.

In the preferred embodiment, the heat transfer cavities 50 in the center zone 20 are disposed substantially parallel to the length. This arrangement of heat transfer cavities allows the center zone 20 of the mold to maintain improved uniformity of temperature throughout the entire length of the center zone 20.

In the preferred embodiment, the heat transfer cavities 50 in the first and second end zones 24, 28 are also disposed substantially parallel to the length. It is believed that this arrangement maintains a fairly constant temperature throughout each of the end zones. The overall arrangement of the heat transfer cavities 50 in the inventive mold provides a mold able to heat and/or cool quickly and evenly. Although illustrated as being continuous channels along the length of the mold within the center zone, first end zone, or second end zone, it is within the scope of the present invention to provide a mold having discontinuous heat transfer cavities. It is further within the scope of the present invention to provide a segmented mold having discrete heat transfer cavities formed therein.

The greatest heat load of the mold is in the first and second transition zones 32, 36. In the preferred embodiment, the heat transfer fluid for the center zone flows through the perpendicular manifolds 40C and 40D and into the heat transfer cavities 50 in the center zone 20. At least one, and preferably two, return manifolds 48C, 48D are located in the center zone 20 for removal of the heat transfer fluid. The heat transfer fluid removed from return manifolds 48C, 48D has been cooled as it traveled from intake manifolds 40C, 40D, respectively. This arrangement of the return manifolds provides greater heat load capacity in the transition area due to the higher fluid temperature. The loss of sensible heat of the fluid in the transition area reduces the heat transfer rate at the middle of the center zone 20, providing an automatic improvement in the temperature distribution in the center zone 20. This shortens cure cycle time and prevents overcure of the belt at the center of the center zone 20.

In the preferred embodiment, heat transfer fluid is introduced into the first and second end zones 24, 28 through intake manifolds 40A, 40B respectively. In the preferred embodiment, the intake manifolds 40A, 40B are located closer to the transition zones 32, 36 than return manifolds 48A, 48B. This arrangement of the manifolds provides greater heat transfer capacity in cooling at the transition zones 32, 36 than in the remaining area of the end zones. This allows the very edges of the mold to remain cool while maintaining a steeper temperature gradient in the transition zones 32, 36. In the preferred embodiment, the heat transfer fluid entering intake manifolds 40A, 40B for the heat cycle is at a predetermined temperature, $T_1$.

In the preferred embodiment, the heat transfer fluid introduced into the intake manifolds 40C, 40D is at a second predetermined temperature, $T_2$. Because it is desirable to maintain cooler end temperatures and a hotter center zone, $T_2$ is preferably greater than $T_1$.

During operation, the heat transfer fluid that enters the perpendicular and parallel cavities in the transition zones encounters the greatest load first by rapidly heating the transition zones. The fluid temperature is therefore reduced so that when the heat transfer fluid flows to the downstream portions of the parallel cavities in the center zone, the heat transfer rate is reduced. The heat transfer rate in each cavity is further reduced relative to other cavities by inserting an appropriate pin into the cavity. This process reduces the tendency of the center zone to heat more rapidly than the end zones and results in a more uniform state of cure for the belt. It also maintains heat flow in the transition zones so that the steepest possible temperature gradient is maintained.

It is desirable to minimize temperature transition times in the cure cycle to provide a more controlled cure. According to another aspect of the invention, the heat transfer rate during temperature transition or at the edges where there is more heat loss can be adjusted easily by adjusting the size and spacing of the cavities.

As previously stated, curing is a non-linear function of the temperature, so those areas of the mold which increase in temperature slower than others can take longer to reach the desired state of cure. This means that maintaining uniform temperature during transition from one temperature to another is important for uniform cure. The tuning pins in the heat transfer channels can be used to adjust the time constant or preheat time at different areas within one zone of the mold so that the temperature changes evenly. The rate of temperature change depends on the temperature difference between the mold and fluid, and on the rate of heat loss in an area. The greatest heat loss is in the transition area. The greatest fluid temperature is near the inlet, so placing the inlet near the transition zone offsets the higher losses of the transition zone. The rate of temperature rise in areas with lower losses does not have to be attenuated as much with the pins to achieve uniform zone temperature.

Figure 2:
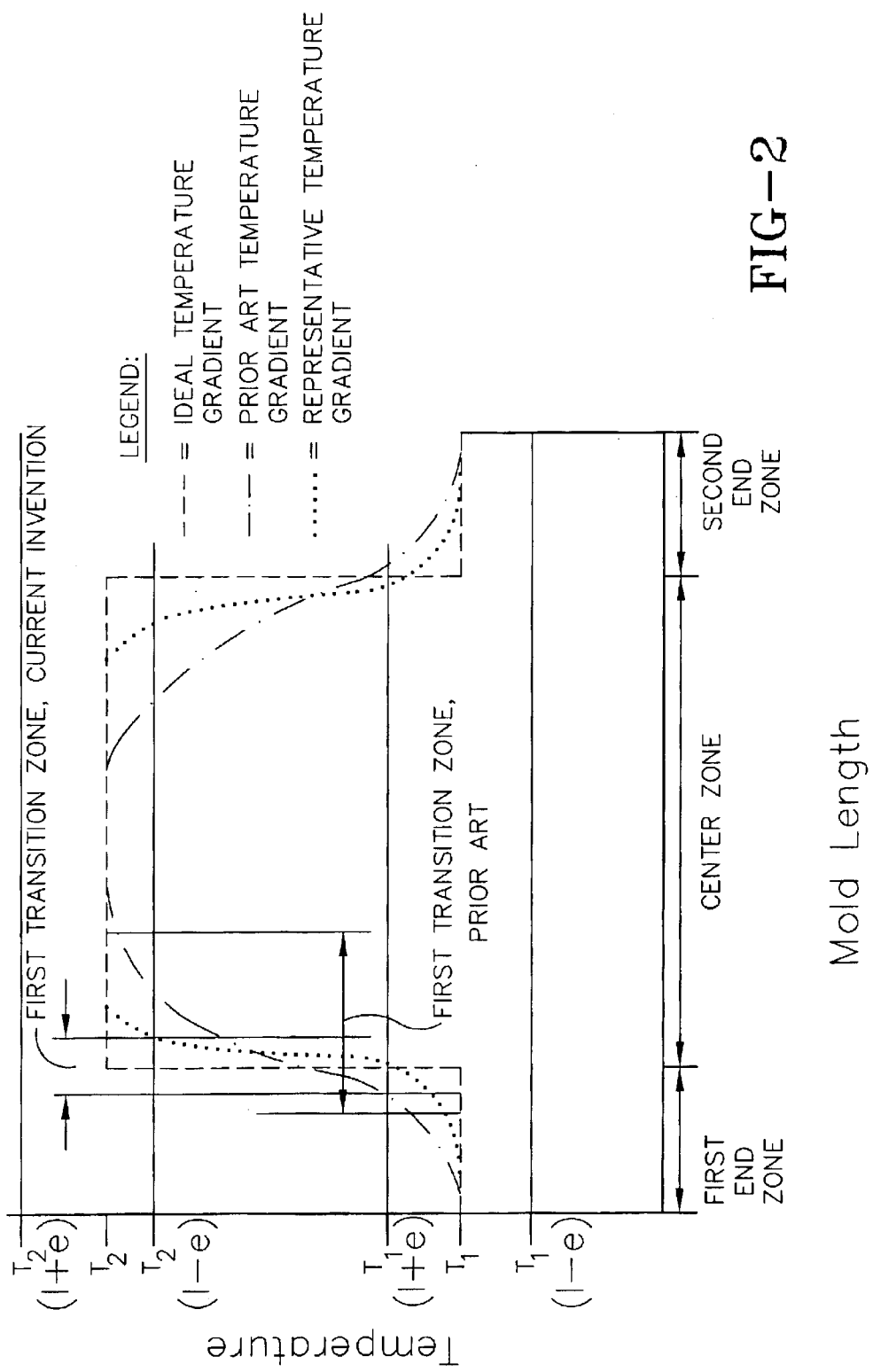
FIG. 2 is a temperature profile of a heated mold according to the present invention.

FIG. 2 illustrates a temperature profile for the inventive mold. The dashed lines illustrate an ideal temperature gradient where the transition from the cooled end zones to the hotter central zone occurs instantaneous. However, there is some temperature gradient in the transition zones due to thermal conductivity of the mold. A goal of the present invention is to provide a steep temperature gradient so that the entire center zone establishes a consistent temperature. The dotted line illustrates a representative temperature gradient achieved by the present invention. The dash-dot line illustrates an undesirable temperature gradient as is common in the prior art.

With continuing reference to FIG. 2, error bands $T_1(1+e)$, $T_1(1-e)$, $T_2(1+e)$, and $T_2(1-e)$ is used to determine the extend of the transition zone into the end zone or center zone. The prior art is a gentle S-curve starting in the end zone and ending in the center zone. In the present invention, the temperature gradient shows a narrower and steeper S-curve extending a shorter distance into the end zone and center zone. As such, reduction in cure time resulting from the steeper S-curve of the present invention. For example, some chemical reactions occur at a rate that doubles for each temperature increase of 10 degrees C. Within limits, the cure time can be cut by approximately 50% by increasing the temperature by 10 degrees C. at the coldest portion of the center zone. At normal cure temperatures and belt thickness, a reduction in temperature variation across the center zone from an error band of 10 degrees C. to an error band of 5 degrees C. can reduce the required cure time by about 25% without reducing the effective width of the center zone.

Figure 3:
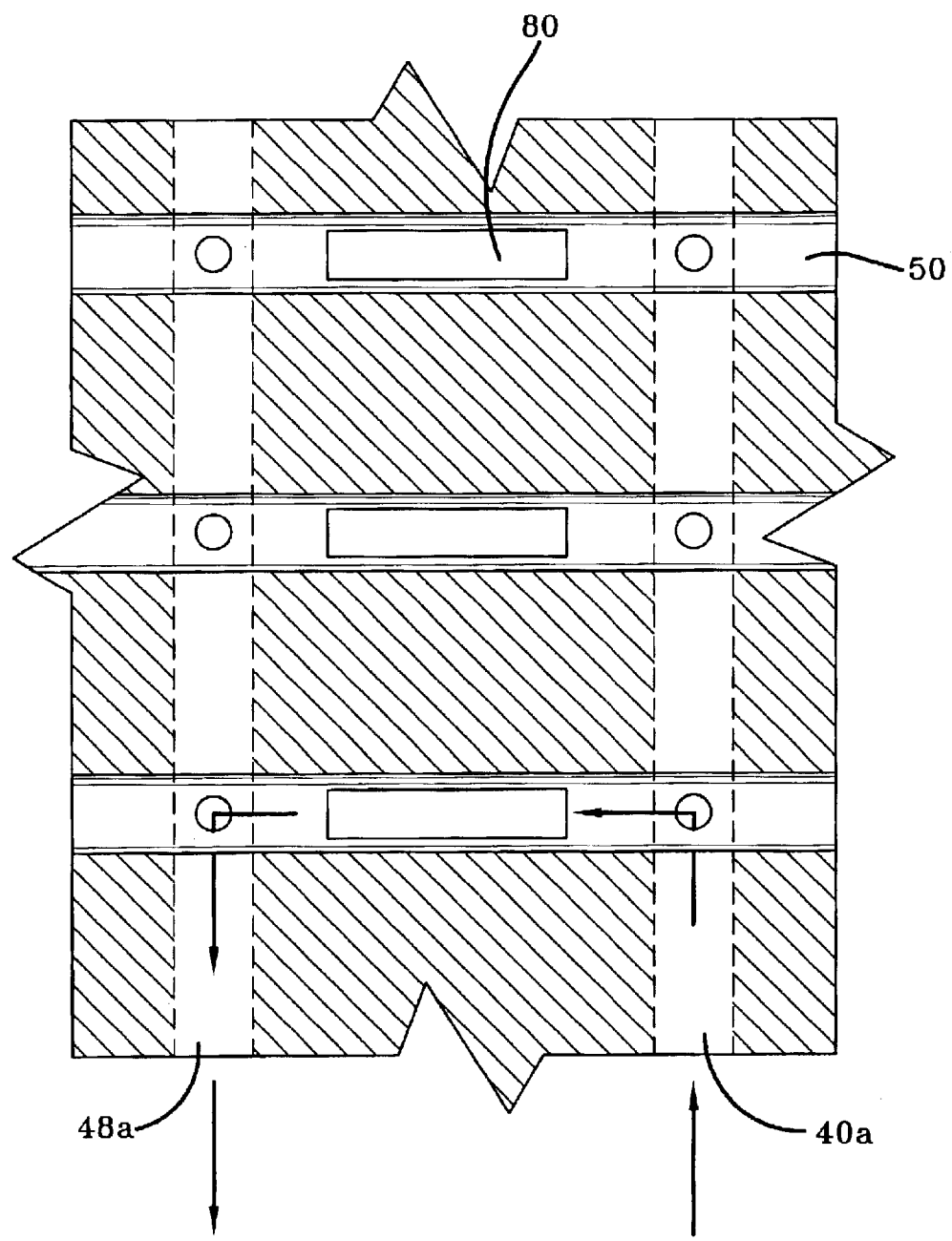
FIG. 3 is a partial sectional view of a mold half according to the present invention; and, FIG. 4 is a schematic representation of the flow of the heat transfer fluid in the inventive mold.

FIG. 3 illustrates a preferred embodiment of the mold wherein the heat transfer rate can be more closely controlled by insertion of a pin or closed tube into the heat transfer cavities 50. In the preferred embodiment, the heat transfer cavity is cylindrical and is fixed in size and location with the mold. The mass and Cp (specific heat) of the pin is such as to form an approximately adiabatic barrier to fluid flow. The aggregate resistance to fluid flow for all cavities and pins connected to one manifold determines the fraction of the flow through each cavity. The shape and cross section of the pin at any point in a cavity can be chosen to affect the average fluid velocity and the thermal and viscous film thickness, thereby controlling the heat transfer rate at that point. It can also be use to reduce the surface area of the cavity exposed to the fluid. The pins can be easily replaced with a pin of different size or shape to adjust the flow rate and heat transfer in a given cavity without modifying the heat transfer cavities in the mold.

In the preferred embodiment, the heat transfer cavities are located within the mold, not in a separate platen, so thermal contact resistance is eliminated.

FIG. 4 is a schematic representation of the flow path of the heat transfer fluid through the inventive mold. It is believed that the use of cooler heat transfer fluid in the end zones, the arrangement of the intake and return manifolds, and the parallel arrangement of the heat transfer cavities in the center zone and the end zones provide a mold having the desirable temperature profile.

In operation, the mold undergoes an initial heat cycle in which the mold is brought up to the desired temperature(s). This operation is also known as "pre-heating." The belt slab is positioned for cure. The mold is closed for the initial "cure cycle." Following a predetermined time, the mold is opened and the belt is repositioned. It is important that the temperature(s) of the mold be maintained near the specified temperature(s) for quick transition between subsequent cure cycles. The mold is reheated, as necessary, to reach the temperature(s) specified at the start of the next cure cycle for each zone.

The preferred embodiments have been described, hereinabove. It will be apparent to those skilled in the art that the above methods may incorporate changes and modifications without departing from the general scope of this invention. It is intended to include all such modifications and alterations in so far as they come within the scope of the appended claims or the equivalents thereof.

What is claimed is:

1. A mold for curing a belt, the mold having a length L1 and a width, and comprising:

a) a center zone, a first end zone, a second end zone, and a first transition zone between the first end zone and the center zone, and a second transition zone between the second end zone and the center zone, each of the transition zones having a length L2, such that L2<L1, the center zone having a length L3, wherein L2<L3;

b) a plurality of intake manifolds disposed substantially perpendicular to the mold length, a first of said intake manifolds being disposed in said first end zone, a second of said intake manifolds being disposed in said second end zone, a third of said intake manifolds being disposed in said first transition zone and a fourth of said intake manifolds being disposed in said second transition zone;

c) a plurality of return manifolds disposed substantially perpendicular to the mold length, a first of said return manifolds being disposed in said first end zone, a second of said return manifolds being disposed in said second end zone, a third and a fourth of said return manifolds being disposed in the center zone; and, d) a plurality of heat transfer cavities, each of the heat transfer cavities being in flow communication with and between at least one intake manifold and one return manifold, wherein the heat transfer cavities in the first and second end zones are disposed substantially parallel to the mold length and are disposed along the width of the mold, wherein coaxial cavities in the center zone and the first and the second end zones are not connected such that the first intake manifold and first return manifold, the second intake manifold and second return manifold, the third intake manifold and third return manifold, and the fourth intake manifold and the forth return manifold, are each adapted to independently circulate heat transfer fluid.

2. The mold of claim 1 wherein:

the heat transfer cavities in the center zone are disposed substantially parallel to the length of the mold.

3. The mold of claim 1 further comprising:

a first pin adapted for selective insertion in one of the heat transfer cavities.

4. A mold for curing a belt, the mold having a length L1, the mold comprising:

a) a center zone, a first end zone, a second end zone, and a first transition zone between the first end zone and the center zone, and a second transition zone between the second end zone and the center zone;

b) means for regulating the temperature of the mold in each of the zones wherein the temperature in the center zone remains substantially consistent throughout the length of the center zone during the cure cycle as the temperature changes in time; and c) a plurality of heat transfer cavities, each of the heat transfer cavities being in flow communication with and between at least one intake manifold and one return manifold wherein the heat transfer cavities in the first and second end zones are disposed substantially parallel to the mold length L1, wherein coaxial cavities in the center zone and the first and the second end zones are not connected.

5. The mold of claim 4, wherein said first transition zone and said second transition zone each have a length L2, wherein heat transfer fluid is adapted to be introduced into a first intake manifold and a second intake manifold at a temperature T1, wherein heat transfer fluid is introduced into a third intake manifold and a fourth intake manifold at a temperature T2, said first intake manifold positioned in said first end zone, said second intake manifold positioned in said second end zone, said third intake manifold positioned in said first transition zone, said fourth intake manifold positioned in said second transition zone, wherein T2 is greater than T1, wherein a temperature gradient is disposed over a length L2 of the mold, wherein L2 is less than L1.

* * * * *